(12) United States Patent  (10) Patent No.: US 7,055,352 B2
Meyerson et al.  (45) Date of Patent: Jun. 6, 2006

(54) APPARATUS FOR STORING AND POSITIONING KEYS

(76) Inventors: David W. Meyerson, 2501 Fairmount Blvd., Cleveland Heights, OH (US) 44106; Cherry A. Bochmann, 481 Bassett Rd., Bay Village, OH (US) 44140; Jess P. Carlson, 30611 Ashton Lan, Bay Village, OH (US) 44140

( * ) Notice: Subject to any disclaimer, the term of this patent is extended or adjusted under 35 U.S.C. 154(b) by 173 days.

(21) Appl. No.: 10/716,962

(22) Filed: Nov. 19, 2003

(65) Prior Publication Data
US 2005/0103070 A1 May 19, 2005

(51) Int. Cl.
A44B 15/00 (2006.01)
(52) U.S. Cl. ................................. 70/456 R; 70/408
(58) Field of Classification Search ...... 70/456 R–460, 70/408, 395–399
See application file for complete search history.

(56) References Cited

U.S. PATENT DOCUMENTS

| | | | | |
|---|---|---|---|---|
| 2,029,696 A * | 2/1936 | Bennett | .................... | 70/456 R |
| 2,047,331 A * | 7/1936 | Pollak | .................... | 70/456 R |
| 2,051,935 A * | 8/1936 | Bennett | .................... | 70/456 R |
| 2,462,206 A * | 2/1949 | Magee | .................... | 206/37.8 |
| 2,517,500 A * | 8/1950 | McPherson et al. | ...... | 70/456 R |
| 2,652,712 A * | 9/1953 | Hoag | .................... | 70/456 R |
| 2,851,872 A * | 9/1958 | Stow | .................... | 70/456 R |
| 3,023,603 A * | 3/1962 | Bowen | .................... | 70/456 R |
| 3,173,280 A * | 3/1965 | Oberacker | .................... | 70/456 R |
| 3,321,943 A * | 5/1967 | Reyes | .................... | 70/456 R |
| 3,613,414 A * | 10/1971 | Ostrager | .................... | 70/294 |
| 3,837,190 A * | 9/1974 | Monk | .................... | 70/456 R |
| 3,882,704 A * | 5/1975 | Shanok et al. | ........... | 70/456 R |
| 4,102,166 A * | 7/1978 | Hughes | .................... | 70/456 R |
| 4,133,195 A * | 1/1979 | McLaren | .................... | 70/456 R |
| 4,512,168 A * | 4/1985 | Reitze | .................... | 70/456 R |
| 4,524,594 A * | 6/1985 | Bascou | .................... | 70/456 R |
| 4,601,185 A * | 7/1986 | Sheldon | .................... | 70/456 R |
| 4,660,397 A * | 4/1987 | Girimont | .................... | 70/456 R |
| 4,768,362 A * | 9/1988 | Schmalz, Jr. | ................ | 70/408 |
| 4,888,970 A * | 12/1989 | Kinzler et al. | ........... | 70/456 R |
| 5,117,666 A | 6/1992 | Keefer | | |
| 5,314,274 A | 5/1994 | Heredia et al. | | |
| 5,339,664 A * | 8/1994 | Mellor | .................... | 70/456 R |
| 5,392,622 A | 2/1995 | O'Donnell | | |
| 5,943,889 A | 8/1999 | Chiu | | |
| 6,000,258 A * | 12/1999 | Lesko | .................... | 70/460 |
| 6,089,060 A * | 7/2000 | Steeley | .................... | 70/456 R |
| 6,604,308 B1 * | 8/2003 | Robles | .................... | 40/330 |
| 6,691,539 B1 * | 2/2004 | Jacob et al. | .................. | 70/408 |
| 6,755,061 B1 * | 6/2004 | Herzenberg | ................. | 70/408 |
| 6,892,558 B1 * | 5/2005 | Chodosh | .................... | 70/456 R |
| 2003/0000267 A1 | 1/2003 | Jacob et al. | | |
| 2004/0148988 A1 * | 8/2004 | Taylor | .................... | 70/408 |

* cited by examiner

FOREIGN PATENT DOCUMENTS

WO 01/48339 7/2001

Primary Examiner—Suzanne Dino Barrett
(74) Attorney, Agent, or Firm—Timothy P. O Hagan (57) ABSTRACT

An apparatus for use in storing and positioning one or more keys includes a housing on which a key retainer is pivotally mounted. A key is connected with the key retainer. An actuator assembly is manually actuatable to release the key for movement between stored and active positions. When the apparatus includes a plurality of keys, a plurality of actuator assemblies are provided. The actuator assemblies may all have manually engageable members disposed on the same side of the housing.

8 Claims, 8 Drawing Sheets

Fig.22

APPARATUS FOR STORING AND POSITIONING KEYS

BACKGROUND OF THE INVENTION

The present invention relates to a new and improved apparatus for storing and positioning one or more keys.

A known device for use in storing and positioning a key includes a housing. The key is movable between a stored position in a slot in the housing and an active position extending from the housing in a direction parallel to a longitudinal axis of the slot. When an actuator member is moved relative to the housing, the key is released for movement from the slot to the active position under the influence of a spring. A device having this construction is disclosed in U.S. Pat. No. 5,943,889 and in U.S. Patent Application Publication No. 2003/0000267 A1.

SUMMARY OF THE INVENTION

The present invention relates to a new and improved apparatus for storing and positioning one or more keys. The apparatus includes a housing. A key is mounted for pivotal movement from a stored position in the housing to an active position extending away from the housing. An actuator assembly is manually operable to effect movement of the key from the stored position to the active position.

The key may be movable from the stored position to either one of two active positions. When the key is in the first active position, the key extends transverse to a longitudinal axis of the housing. When the key is in a second active position, the key extends parallel to the longitudinal axis of the housing. A greater or lesser number of active positions may be provided if desired.

The key may be connected with a key retainer which is mounted for pivotal movement relative to the housing. When a key retainer is utilized, an end portion of the key may be connected with the key retainer with a shank portion of the key extending away from the key retainer. When a plurality of keys are provided, a plurality of key retainers may be provided. When there are a plurality of keys, shank portions of two of the keys may be disposed in a side-by-side relationship with each other in the housing when the keys are in their stored positions. Key identifiers may be connected with the key retainers.

When a plurality of keys are utilized, the actuators for the keys may all have manually movable members which are accessible from the same side of the housing. This enables an auxiliary unit to be connected with the opposite side of the housing. One or more magnets may be provided in the housing to secure the auxiliary unit to the housing.

The auxiliary unit may have many different constructions and purposes. For example, the auxiliary unit may be a remote keyless entry unit. Alternatively, the auxiliary unit may be another housing for a plurality of keys. If desired, the auxiliary unit may be secured to the housing with fasteners other than magnets.

The key or keys may be blanks which are capable of being modified for association with specific locks. Alternatively, the keys may have already been modified for association with specific locks. A head end portion of the key may be partially cut away to enable the key to be connected with a key retainer.

The present invention has many different features which may be utilized together in the manner disclosed herein. Alternatively, the various features may be used separately or in different combinations with each other. For example, the apparatus may be constructed without magnets to attract a unit to be connected with the apparatus. As another example, the key retainer may be eliminated and the head end portion of the key connected with the housing. As was previously mentioned, the apparatus may be constructed so as to store only a single key or may be constructed so as to store a plurality of keys.

BRIEF DESCRIPTION OF THE DRAWINGS

The foregoing and other features of the invention will become more apparent upon consideration of the following description taken in connection with the accompanying drawings wherein.

DESCRIPTION OF SPECIFIC PREFERRED EMBODIMENTS OF THE INVENTION

General Description

An apparatus 30 (FIG. 1), constructed in accordance with the present invention, is used to store and position keys. In the specific embodiment of the invention illustrated in FIG. 1, the apparatus 30 is utilized to store and position four keys. However, it should be understood that the apparatus 30 may be constructed so as to store and position a greater or lesser number of keys.

Figure 1:
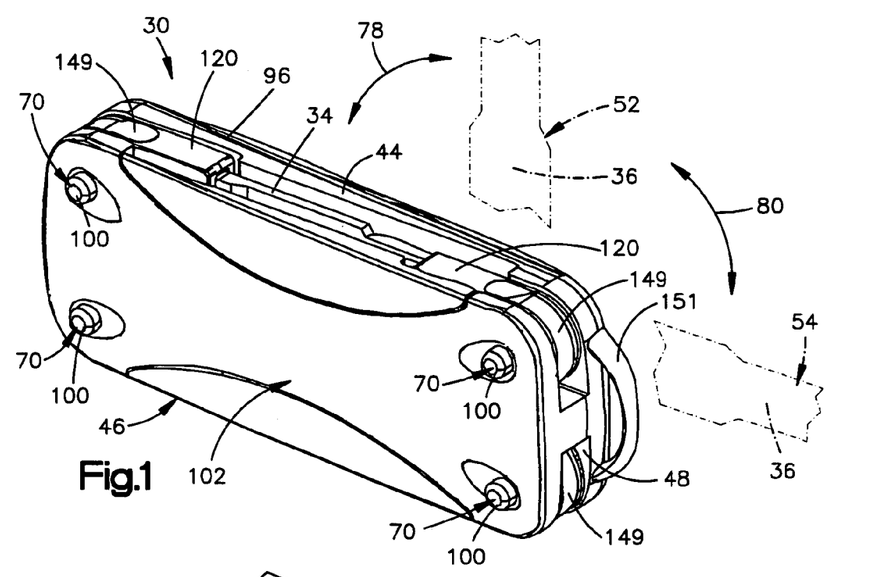
FIG. 1 is a pictorial illustration of an apparatus constructed in accordance with the present invention to store and position a plurality of keys.
Figure 2:
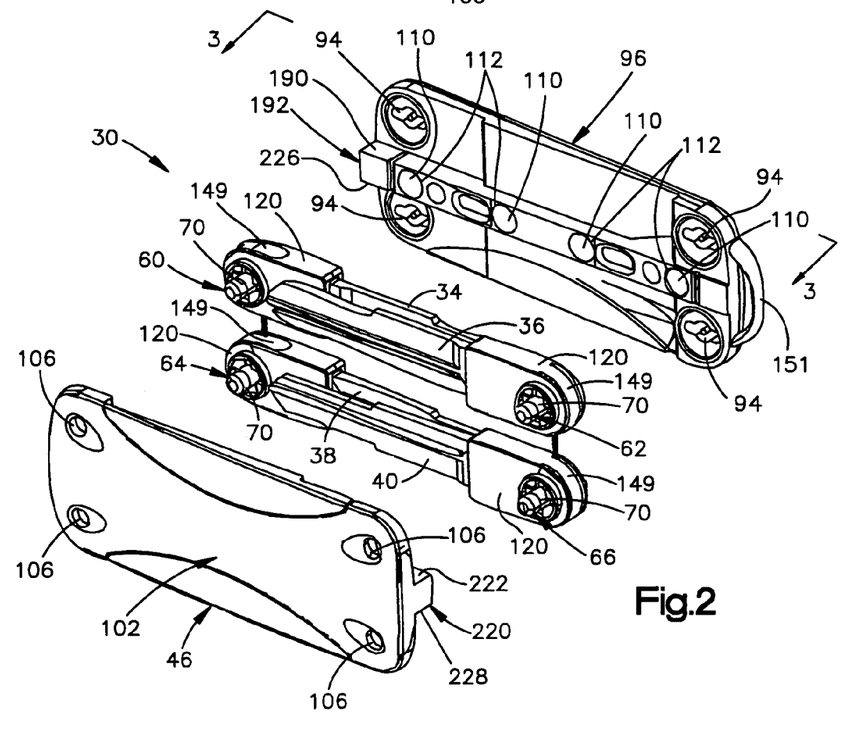
FIG. 2 is an exploded pictorial illustration of the apparatus of FIG. 1.
Figure 3:
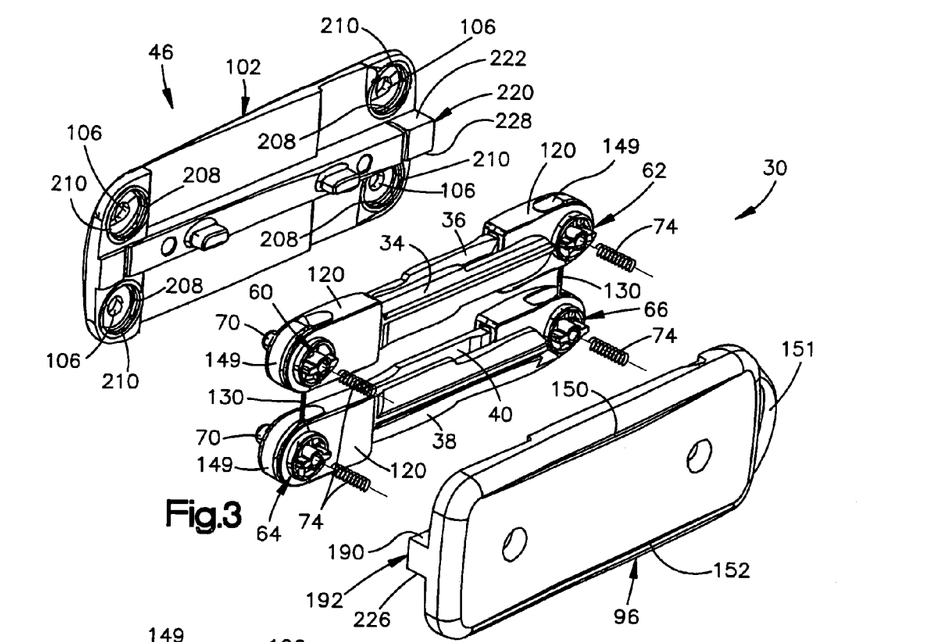
FIG. 3 is an exploded pictorial illustration, generally similar to FIG. 2 and taken along the line 3—3 of FIG. 2, further illustrating the construction of the apparatus of FIG. 1.

The four keys which are stored in the apparatus 30 are illustrated in FIGS. 2 and 3 and include upper keys 34 and 36 and lower keys 38 and 40. The upper keys 34 and 36 are stored in a side-by-side relationship in an upper slot 44 (FIG. 1) formed in a housing 46. Similarly, the lower keys 38 and 40 (FIGS. 2 and 3) are stored in a side-by-side relationship in a lower slot 48 (FIG. 1) formed in the housing 46. The two slots 44 and 48 have the same general configuration and have longitudinal central axes which extend parallel to a longitudinal central axis of the generally rectangular housing 46. If desired, the housing 46 may be constructed with either a greater or lesser number of slots.

Each of the keys 34–40 is movable from the side-by-side stored orientation illustrated in FIGS. 2 and 3 to either one of two active orientations illustrated in dashed lines in FIG. 1 for the key 36. The key 36 is movable from a stored position extending parallel to a longitudinal central axis of the upper slot 44 to a first active position 52, indicated in dashed lines in FIG. 1. When the upper key 36 is in the first active position 52, the key extends transverse to a longitudinal central axis of the upper slot 44.

The upper key 36 is movable from the first active position, illustrated in dashed lines at 52 in FIG. 1, to a second active position, illustrated in dashed lines at 54 in FIG. 1. When the upper key 36 is in the second active position, indicated in dashed lines at 54 in FIG. 1, the key extends parallel to the longitudinal central axis of the upper slot 44. Although the two active positions 52 and 54 for only the key 36 have been illustrated in FIG. 1, it should be understood that each of the keys 34–40 is movable from the stored position of FIGS. 2 and 3 to active positions in which the key extends either transverse or parallel to the longitudinal central axis of the upper slot 44 and to the longitudinal central axis of the lower slot 48. In the embodiment of the invention illustrated in FIGS. 1–3, each of the keys 34–40 has two active positions, corresponding to the active positions 52 and 54 (FIG. 1) for the upper key 36. However, it should be understood that each key 34–40 may have a smaller or larger number of active positions if desired.

When a key 34, 36, 38, or 40 is in its stored position it is disposed in one of the slots 44 or 48. At this time, the key is enclosed by the housing 46. When a key 34, 36, 38, or 40 is in one of its active positions, the key extends outward away from an end portion of the associated slot 44 or 48. At this time, the key is exposed so that it can be inserted into an associated lock. A key 34, 36, 38 or 40 may be inserted into an associated lock when the key is in either one of its two active positions 52 or 54.

Identical actuator assemblies 60, 62, 64 and 66 (FIGS. 2 and 3) are provided in association with the keys, 34, 36, 38 and 40. The actuator assemblies 60–66 are manually operable to release the keys 34–40 for movement between their stored positions and their first and second active positions. The actuator assemblies 60–66 are all manually actuatable from one side of the housing 46. The actuator assemblies 60–66 may be manually actuatable from both sides of the housing 46 if desired. However, it is believed that it will be preferred to have the actuator assemblies 60–66 actuatable from only one side of the housing 46.

Each of the actuator assemblies 60–66 includes a manually engageable control member 70 (FIGS. 1 and 2). Control member biasing springs 74 (FIGS. 3, 4 and 5) urge the identical control members 70 toward engaged positions in which the control members are effective to maintain the associated key 34, 36, 38 or 40 in either the stored position of FIGS. 2 and 3 or one of the active positions 52 and 54, illustrated in dashed lines in FIG. 1 for the key 36. All of the keys 34–40 have two active positions, corresponding to the two active positions 52 and 54 for the key 36. Of course, the keys 34–40 may have a greater or lesser number of active positions.

When the control member 70 is manually depressed against the influence of the associated biasing spring 74, the key 34, 36, 38, or 40 associated with the control member is released for movement between the stored position and the two active positions, in the manner indicated schematically by arrows 78 and 80 in FIG. 1. When the manually engageable member 70 is released, the associated control member biasing spring 74 moves the control member outward to hold the associated key 34, 36, 38 or 40 in the stored position or one of the active positions.

The identical control members 70 are integrally formed as one piece of metal. The one piece metal control members 70 have inner end portions 84 (FIGS. 4 and 5) with a pair of flanges 86 and 88. The flat rectangular flanges 86 and 88 project in radially opposite directions from a hollow cylindrical body 90 of the control member 70. The cylindrical coil biasing spring 74 is telescopically received in the hollow cylindrical body 90 of the control number 70.

The inner end portions 84 of the control members 70 are telescopically received in identical sockets 94 (FIG. 2) formed in a rear section 96 of the housing 46. The flanges 86 and 88 (FIGS. 4 and 5) on the control members 70 slidably engage flat retainer surfaces of recesses in the sockets 94 to hold the control members against rotation relative to the housing 46. Although the control members 70 can not rotate relative to the housing 46, they are movable along their central axes relative to the housing. As the control members 70 move relative to the sockets 94 (FIG. 2), the flanges 86 and 88 slide along the retainer surfaces of recesses formed in the sockets 94. The cooperation between the recesses in the sockets 94 and the flanges 86 and 88 is effective to hold the control members 70 against rotation about their central axes.

Figure 4:
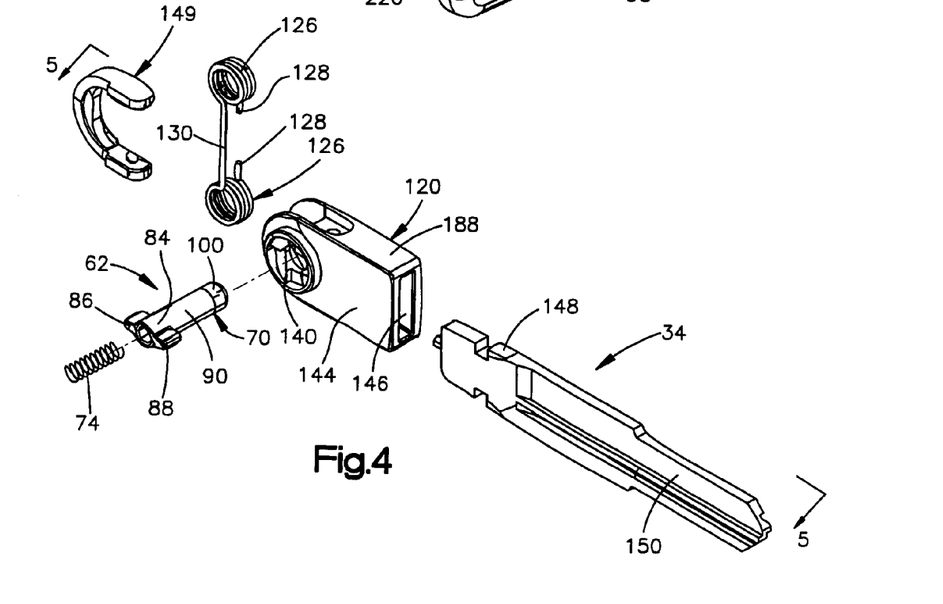
FIG. 4 is an exploded pictorial illustration of a portion of the apparatus of FIGS. 2 and 3 and illustrating the relationship of a key to a key retainer and an actuator assembly.
Figure 5:
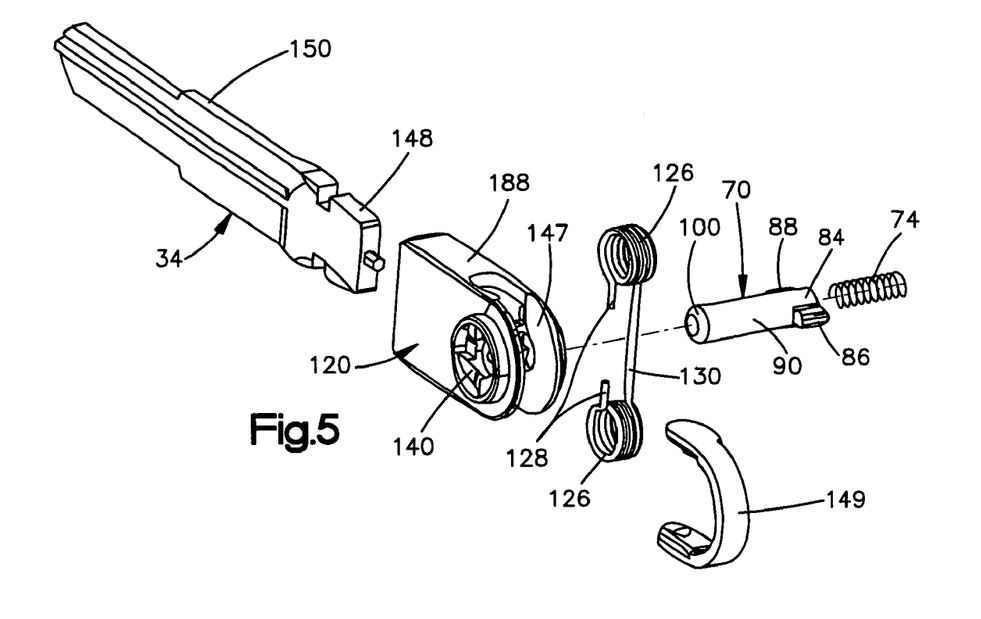
FIG. 5 is an exploded pictorial illustration, generally similar to FIG. 4 and taken along the line 5—5 of FIG. 4.

The control members 70 have manually engageable cylindrical outer end portions 100 (FIGS. 4 and 5). The outer end portions 100 of the control members 70 are all disposed adjacent to a front section 102 (FIG. 1) of the housing 46. The outer end portions 100 of the cylindrical bodies 90 (FIGS. 4 and 5) of the manually engageable control members 70 extend through circular openings 106 (FIGS. 2 and 3) formed in the front section 102 of the housing 46. Therefore, the manually engageable control members 70 are all accessible from the front side of the apparatus 30 (FIG. 1). However, the apparatus 30 may be constructed so that some of the control members 70 are engageable from the back side of the apparatus. For example, the control members 70 associated with the keys 34 and 38 may be accessible from the rear side of the apparatus 30 while the control members 70 associated with the keys 36 and 40 are accessible from the front side of the apparatus.

By having the manually engageable control members 70 all accessible from the front side of the apparatus 30, the rear side of the apparatus (FIG. 3) is free of controls for the apparatus. This enables an auxiliary unit to be connected with the rear section 96 of the apparatus 30. Although many different types of auxiliary units may be connected with the rear section 96 of the apparatus 30, it is contemplated that a remote keyless entry unit may be connected with the rear section 96 of the apparatus 30. The remote keyless entry unit may contain a transmitter and/or other electronic circuitry which is activatable to effect locking and/or unlocking of a vehicle door and/or trunk while the remote keyless entry unit is located at some distance from the vehicle.

Alternatively, the auxiliary unit connected with the apparatus 30 may be a second embodiment of the apparatus 30. A combination of two of the apparatus 30 would result in an assembly which could be utilized with eight keys. If this is done, the rear side of the second embodiment of the apparatus 30 would be positioned adjacent to the rear side of the first embodiment of the apparatus 30. This would result in manually engageable control members 70 being exposed on opposite sides of the assembly formed by the combination of two of the apparatus 30.

Of course, the auxiliary unit may have any one of many different constructions and be used for any one of many different purposes. For example, the auxiliary unit may be a cellular telephone.

It is contemplated that an auxiliary unit may be connected with the apparatus 30 in many different ways. However, it is believed that is may be preferred to utilize a plurality of magnets 110 (FIG. 2) to connect an auxiliary unit with the apparatus 30. The magnets 110 have a cylindrical configuration and are received in cylindrical recesses 112 (FIG. 2) formed in the rear section 96 of the housing 46. Although the magnets 110 have been illustrated as having a cylindrical configuration, it is contemplated that the magnets may have a different configuration. For example, the magnets 110 may have a rectangular configuration. If desired, one relatively long magnetic strip may be used in place of the plurality of magnets 110.

The magnets 110 attract other magnets and/or magentizable material in the auxiliary unit to connect the auxiliary unit with the rear section 96 of the housing 46. However, if desired, the auxiliary unit may be connected with the housing 46 in a different manner. For example, a hook and loop fastener such as "velcro" (trademark) or a similar releasable fastener may be utilized to connect the auxiliary unit with the rear section 96 of the housing 46. Alternatively, a mechanical fastener may be utilized to connect the auxiliary unit with the rear section 96 of the housing 46.

The illustrated housing 46 has a front section 102 and a rear section 96. However, the housing 46 may have a different construction and/or configuration. For example, the housing 46 may be formed as one piece. The one piece housing may have a longitudinally extending center section with flanges at opposite ends of the center section.

The keys 34–40 are mounted for pivotal movement relative to the housing 46 by key retainers 120 (FIGS. 4, 5, 6, 7 and 8). Since there are four keys 34–40, the apparatus 30 includes four identical key retainers 120 (FIGS. 2 and 3). Each of the key retainers 120 is fixedly connected to one of the keys 34–40. Of course, if there were a greater or lesser number of keys, there would be a greater or lesser number of key retainers.

The key retainers 120 are pivotal relative to the housing 46 about parallel axes which are coincident with central axes of the control members 70 (FIGS. 2 and 3). Pivotal movement of a key retainer 120 moves the associated key between a stored position disposed in one of the slots 44 or 48 (FIG. 1) and one of the active positions in which the key extends either perpendicular to a longitudinal central axis of the associated slot or parallel to a longitudinal central axis of the associated slot in the manner illustrated schematically in FIG. 1 for the key 36.

The key retainers 120 are pivotal about parallel axes which extend through opposite end portions of the upper and lower slots 44 and 48. The key retainer 120 for the upper key 34 is pivotal about an axis extending through the left (as viewed in FIG. 1) end portion of the upper slot 44. Similarly, the key retainer 120 for the upper key 36 is pivotal about an axis extending through the right end portion of the upper slot 44. This results in the upper keys 34 and 36 being disposed in a side-by-side relationship (FIG. 2) and extending in opposite directions from their associated key retainers 120 when the upper keys 34 and 36 are in their stored positions.

The key retainer 120 for the lower key 38 is pivotal about an axis extending through the left (as viewed in FIG. 1) end portion of the lower slot 48. Similarly, the key retainer 120 for the lower key 40 is pivotal about an axis extending through the right end portion of the lower slot 48. This results in the lower keys 38 and 40 being disposed in a side-by-side relationship (FIG. 2) and extending in opposite directions from their associated key retainers 120 when the lower keys 38 and 40 are in their stored positions.

A biasing spring 126 (FIGS. 4 and 5) is provided in association with each of the key retainers 120. The biasing spring 126 is effective to move a key retainer 120 from a stored position in which the associated key is in the stored position illustrated in FIGS. 1–3 to either one of the two active positions. The biasing spring 126 has a relatively short spring arm 128 which is connected with the associated key retainer 120 and a relatively long spring arm 130 which is connected with a biasing spring 126 for an adjacent key. If desired, the relatively long spring arm 130 may be connected with the housing 46. If this is done, the spring arm 130 may be divided into two sections, that is, one section connected with the lower spring 126 and one section connected with the upper spring 126 (see FIGS. 4 and 5).

Each of the identical key retainers 120 includes a circular control section 140 (FIG. 6–8) which cooperates with a manually engageable control member 70 (FIGS. 4 and 5) to hold an associated key 34–40 (FIGS. 2 and 3) in the stored position, the first active position 52 (FIG. 1), or the second active position 54. When the control member 70 associated with a particular key, for example, the key 36, is manually depressed, the key is released for movement, under the influence of the associated biasing spring 126, from the stored position illustrated in solid lines in FIG. 1 to the first active position illustrated in dashed lines at 52 in FIG. 1 and to the second active position illustrated in dashed lines at 54 in FIG. 1. To move a key from one of its active positions back to its stored position, manual force may be applied to the key to move the key against the influence of its associated biasing spring 126.

Figure 7:
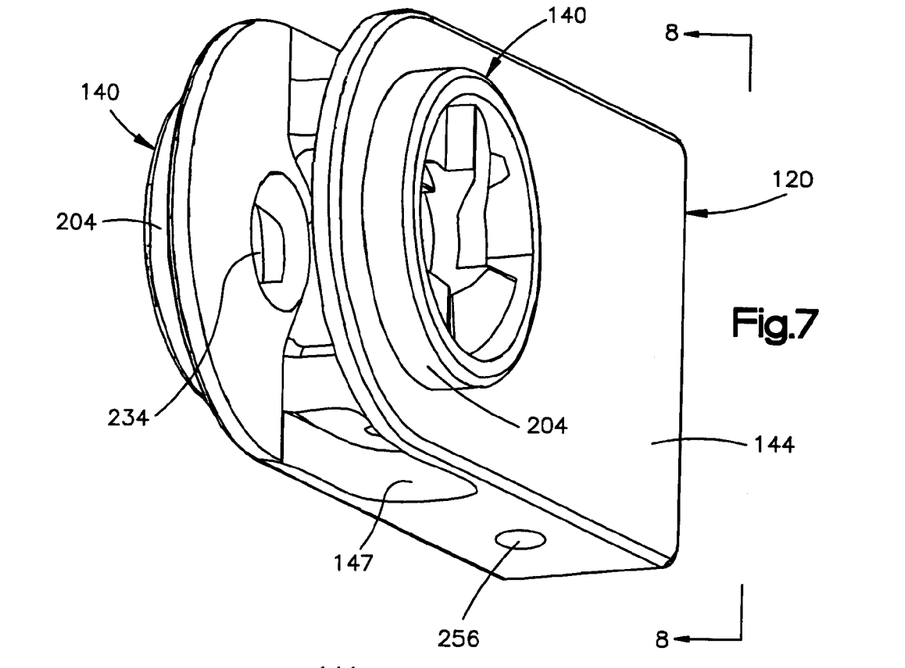
FIG. 7 is a pictorial illustration further illustrating the construction of the key retainer of FIG. 6.
Figure 8:
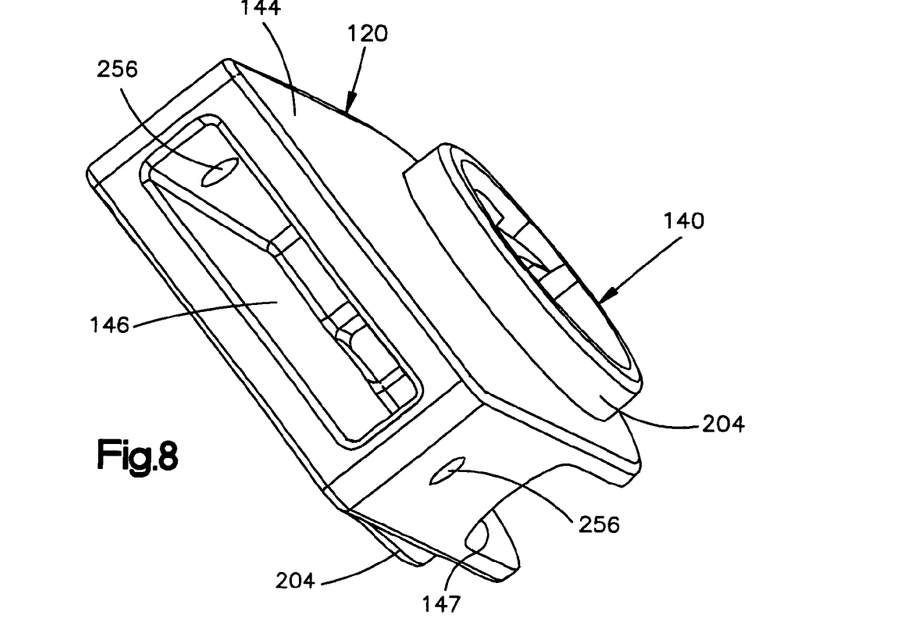
FIG. 8 is a pictorial illustration, taken generally along the line 8—8 of FIG. 7, and further illustrating the construction of the key retainer.

Each of the identical key retainers 120 has a generally rectangular body portion 144 (FIGS. 6–8) which defines a socket 146 (FIG. 8). The socket 146 receives an end portion 148 (FIGS. 4 and 5) of a key, such as the key 36. A shank portion 150 of the key 36 extends from the key retainer 120. The key 36 is held against movement relative to the key retainer 120 by engagement of the end portion 148 of the key with the key retainer.

Figure 6:
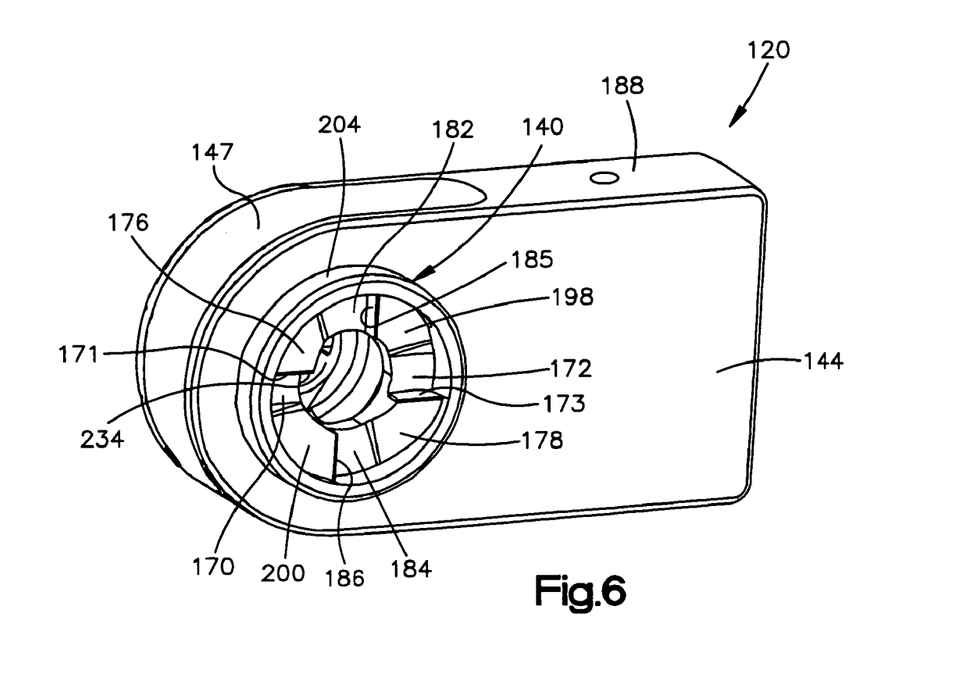
FIG. 6 is an enlarged pictorial illustration of a key retainer utilized in the apparatus of FIGS. 2–5.

It is contemplated that the key retainers 120 may have a construction and/or configuration which is different than is illustrated in FIGS. 6–8. For example, the socket 146 may be omitted. If this is done, the end portion 148 (FIGS. 4 and 5) of a key, such as the key 36, may be received in a shallow recess in the key retainer and held in place by a strap and/or other fastener.

In the specific embodiment illustrated in FIGS. 1–5, the keys 34–40 (FIGS. 2 and 3) are key blanks. The key blanks forming the keys 34–40 are customized for insertion into a specific lock by a known notching or indenting process. Rather than being key blanks, it is contemplated that the keys 34–40 (FIGS. 2 and 3) may be keys which have already been customized to be associated with a specific lock.

If desired, electronic controls may be provided in association with one or more of the keys 34–40 (FIGS. 2 and 3) to cooperate with electronic controls associated with a specific lock. Thus, a transceiver or a transponder may be mounted in the housing 46 in association with one of the keys 34–40. If a transceiver or transponder is to be mounted in the housing 34, a suitable recess may be provided in the housing to receive the transceiver or transponder.

Alternatively, the transceiver or transponder may be mounted in the key retainer 120 to which the associated key is to be connected. A separate recess may be provided in the key retainer 120 to receive the transponder or transceiver. Alternatively, the transponder or transceiver may be positioned in the socket 146 along with the associated key.

Other electrical circuitry may be mounted in the housing 34 and/or in the key retainer 120 in association with a selected one of the keys 34–40. For example, a light source or electronic circuitry may be mounted in the housing 46 and/or key retainer 120. If a light source or electronic circuitry is utilized in association with one or more of the keys 34–40, a battery may also be mounted in the housing 46 and/or key retainer 120.

Key identifiers 149 (FIGS. 4 and 5) are mounted on the key retainers 120 to facilitate identification of the keys 34, 36, 38 and 40 associated with the key retainers. Each key identifier 149 has a different color and is visible when the associated key is in the stored position (FIG. 1). For example, the key identifier 149 associated with the key 34 may be red. The key identifier 149 associated with the key 36 may be blue. A yellow key identifier 149 may be associated with the key 38. Similarly, a green key identifier 149 may be associated with the key 40.

The key identifiers 149 snap into recesses 147 (FIGS. 4 and 5) formed in the key retainers 120. Rather than using key identifiers 149, the key retainers 120 may be color-coded. Alternatively, letters and/or numerals may be associated with the key retainers 120 to identify the keys 36–40.

Housing

The housing 46 includes the rear section 96 and the front section 102 (FIGS. 2 and 3). The separate rear and front sections 96 and 102 are each integrally molded as one piece of polymeric material. The rear and front section 96 and 102 of the housing 46 are interconnected by being bonded together with the key retainers 120, actuator assemblies 60–66, and magnets 110 disposed between the rear and front sections. Rather than being bonded together, it is contemplated that the rear and front sections 96 and 102 may be interconnected with a suitable fasteners, such as screws.

Once the rear and front sections 96 and 102 (FIGS. 2 and 3) of the housing 46 have been interconnected, the rear and front sections of the housing define the parallel upper and lower slots 44 and 48. The keys 34–40 are received in a side-by-side relationship in the slots 44 and 48 when the keys are in their stored positions (FIGS. 1–3). It is contemplated that the housing 46 may be provided with more than the two slots 44 and 48 illustrated in FIG. 1. For example, the housing 46 may be provided with four slots. If this is done, the manually engageable control members 70 for keys in slots disposed adjacent to the front side of the housing may be exposed in the front section 102 of the housing. Control members 70 for keys adjacent to the rear side of the housing may be exposed at the rear section 96 of the housing.

The rear section 96 of the housing includes a loop or ring 151 (FIGS. 1 and 2) to which a key, in addition to the keys 34–40, may be connected. It is contemplated that keys having transponders built into their head end portions may be connected with the loop 151. If desired, articles other than keys may be connected with the loop 151.

It is contemplated that recesses may be formed in the rear section 96 and/or the front section 102 of the housing 46 to receive an electronic components associated with the keys 34–40. These electronic components may include a transponder and/or transceiver. Of course, other electrical circuitry may be mounted in recesses formed in either or both the rear section 96 and front section 102 of the housing 46.

The rear section 96 of the housing 46 (FIG. 3) has index elements to orient an auxiliary unit relative to the apparatus 30. Although the index elements may have many different configurations, the housing 46 has index elements formed by a linear rib 150 and a linear groove 152. The rib 150 is engageable with a corresponding groove in the auxiliary unit. Similarly, the groove 152 is engageable by a corresponding rib on the auxiliary unit.

The rib 150 and groove 152 cooperate with the rib and groove on the auxiliary unit to orient magnets in the auxiliary unit relative to the magnets 110 (FIG. 3) in the apparatus 30. Of course, cooperation of the rib 150 and groove 152 on the rear section 96 of the apparatus 30 with a corresponding groove and rib in the auxiliary unit is effective to align features of the auxiliary unit with features of the apparatus 30 other than the magnets 110. The auxiliary unit may not contain magnets which cooperate with the magnets 110 in the apparatus 30. The auxiliary unit may contain a metal which is magnetically attracted by the magnets 110.

Actuator Assemblies

The identical actuator assemblies 60–66 (FIGS. 2 and 3) cooperate with the identical key retainers 120 to release the key retainers for movement between the stored and active positions. When one of the keys 34–40 is in an active position, the associated biasing spring 126 (FIGS. 4 and 5) is effective to urge the key to the position in which it is in. This enables a key to be moved from one of its active positions back to its stored position by applying manual force against the key.

If desired, the control sections 140 of the key retainers 120 may be constructed so as to lock the keys 34–40 in their active positions. If this is done, a control member 70 would have to be manually actuated to release a key for movement from one of its active positions. However, it is believed that it will be preferred to have the keys 34–40 be movable from their active positions back to their stored positions, against the influence of the biasing springs 126, without actuating the control members 70.

When a manually actuatable control member 70 in one of the actuator assemblies 60–66 associated with the one of the keys 34–40 is manually depressed against the influence of the associated biasing spring 74, the associated key is released for movement from its stored position to one of its active positions 52 or 54 (FIG. 1). The key is moved from its stored position to the first one of the active positions 52 and from the first one of the active positions to the second one of the active positions 54 by the associated biasing spring 126. The key is manually moved from either the first or the second active position 52 or 54 back to its stored position against the influence of the associated biasing spring 126 by the application and manual force to the key. As was previously mentioned, a key 34–40 may be manually moved from either one of its active positions 52 or 54 back to its stored position without pressing the associated control member 70.

Figure 9:
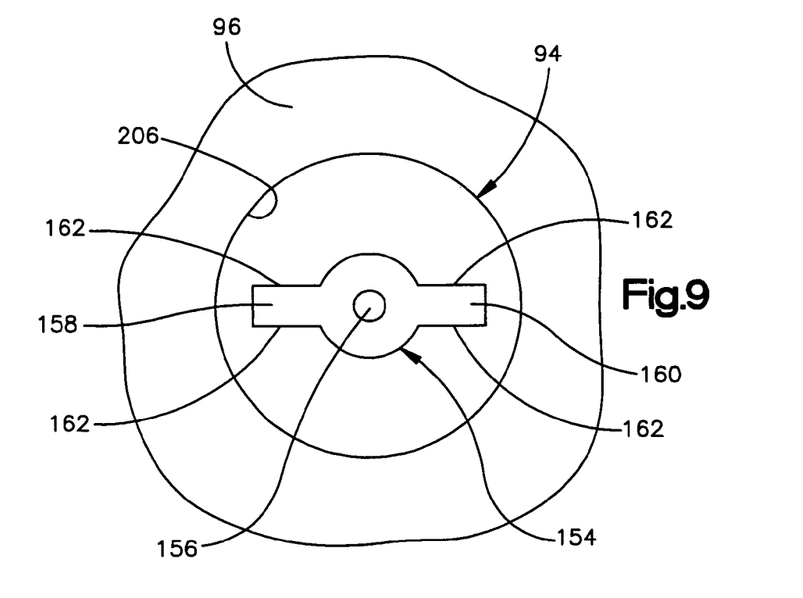
FIG. 9 is a fragmentary schematic plan view of a control member socket formed in a rear section of a housing of the apparatus of FIG. 1.

The flanges 86 and 88 (FIGS. 4 and 5) on the inner end portion 84 of the manually engageable control member 70 are disposed in a socket 94 (FIG. 2) formed in the rear section 96 of the housing 46. The socket 94 (FIG. 9) has a cylindrical central opening 154 which telescopically receives the cylindrical body 90 (FIGS. 4 and 5) of the control member 70. A cylindrical pin 156 (FIG. 9) is disposed in the center of the opening 154. The pin 156 extends into a portion of the central opening in the hollow control member 70 and into the helical coil biasing spring 74 (FIGS. 4 and 5). The pin 156 maintains the biasing spring 74 in a coaxial relationship with the manually engageable control member 70.

The central opening 154 (FIG. 9) in the socket 94 has radially extending retaining sections 158 and 160. The flanges 86 and 88 (FIGS. 4 and 5) on the manually engageable control member 70 are received in the retaining sections 158 and 160 (FIG. 9) of the central opening 154. The flanges 86 and 88 on the manually engageable control member 70 are slidable along parallel retaining surfaces 162 on the retaining sections 158 and 160 of the central opening 154 during axial movement of the manually engageable control member.

The retaining surfaces 162 on the retaining sections 158 and 160 of the central opening 154 cooperate with the flanges 86 and 88 (FIGS. 4 and 5) on the manually engageable control member 70 to block rotation of the manually engageable control member. The flanges 86 and 88 remain in engagement with the retaining surfaces 162 (FIG. 9) throughout the range of axial movement of the control member 70. Therefore, the control member 70 can only be moved axially relative to the housing 46 and can not be rotated relative to the housing.

When manual force is applied against the outer end portion 100 (FIGS. 4 and 5) of the control member 70 to depress the control member against the influence of the biasing spring 74, the inner end portion 84 of the control member 70 moves further into the associated one of the central openings 154 in one of the sockets 94 (FIGS. 2 and 9) in the rear section 96 of the housing 46. Thus, the flanges 86 and 88 (FIGS. 4 and 5) on the control member 70 slide along the retaining surfaces 162 (FIG. 9) toward the rear side of the rear section 96 and the bottom of the central opening 154 in the associated socket 94 when the outer end portion 100 of the control member is manually depressed against the influence of the spring 74.

When a depressed control member 70 is manually released, the spring 74 is effective to move the flanges 86 and 88 (FIG. 4) toward the front section 102 of the housing 46. As this occurs, the flanges 86 and 88 slide along the retaining surfaces 162 (FIG. 9) of the central opening 154 in the associated socket 94. A portion of the flanges 86 and 88 remain in engagement with the surfaces 162 on the central opening 154 in the associated socket 94 when the control member 70 is released.

Each of the key retainers 120 (FIGS. 6, 7 and 8) has a pair of circular control sections 140 disposed on opposite sides of the key retainer. This results in the key retainer 120 having a symmetrical configuration so that it can be positioned in the housing 46 in either one of two orientations. Although the key retainer 120 is provided with two control sections 140, the flanges 86 and 88 (FIGS. 4 and 5) on the associated control member 70 cooperate with only the control section 140 which is disposed closest to the rear section 96 of the housing. This enables the flanges 86 and 88 to remain in engagement with the retaining surfaces 162 (FIG. 9) in the sockets 94 and to engage the control section 140 on the rear side of an associated key retainer 120.

Each control section 140 includes a first recess 170 (FIG. 6) which is engaged by the flange 86 on the control member 70 when the key 34 is in the stored position illustrated in FIGS. 1–3. At this time, the other flange 88 on the control member 70 is disposed in engagement with a second recess 172 (FIGS. 5 and 6). The flanges 86 and 88 on the control member 70 are engaged by stop surfaces 171 and 173 (FIG. 6). The flanges 86 and 88 (FIG. 5) on the control member 70 engage the stop surfaces 171 and 173 at the diametrically opposite recesses 170 and 172 to hold the key retainer 120 against rotation about the central axis of the manually engageable control member 70. This results in the associated key, for example the key 34 of FIGS. 4 and 5, being held in the stored condition of FIGS. 2 and 3 against the influence of the associated biasing spring 126.

When the control member 70 is manually depressed, the flanges 86 and 88 on the control member slide rearwardly out of the recesses 170 and 172 on the control section 140. This disengages the flanges 86 and 88 from the stop surfaces 171 and 173 and releases the key retainer 120 for pivotal movement under the influence of the biasing spring 126. The force applied against the key retainer 120 by the biasing spring 126 is effective to pivot the key retainer in a counterclockwise direction (as viewed in FIGS. 3, 4 and 6) about the coincident central axes of control section 140 and the control member 70. As this occurs, arcuate ramps 176 and 178 (FIG. 6) on the control section 140 are moved past the stationary flanges 86 and 88 on the control member 70. If manual pressure against the control member 70 is released shortly after the key retainer 120 beings to pivot under the influence of the biasing spring 126, the flanges 86 and 88 on the control member are pressed against the ramps 176 and 178 by the control member biasing spring 74. The ramps 176 and 178 have a wedge shaped cross section and slope away from the stop surfaces 171 and 173 and axially inward of the control section 140.

Assuming the manual pressure on the control member 70 is released shortly after the key retainer 120 begins to pivot from its stored position, the flanges 86 and 88 on the control member are pressed against the ramps 176 and 178 (FIG. 6) by the control member biasing spring 74. The control member 70 moves axially in a direction toward the front section 102 of the housing 46 as the ramps 176 and 178 slide along the flanges 86 and 88. This results in the flanges 86 and 88 sliding outward along the retaining surfaces 162 in the socket 94 as the ramps 176 and 178 move along the flanges.

As the counterclockwise pivotal movement (as viewed in FIG. 6) of the key retainer 120 continues, third and fourth recesses 182 and 184 move into alignment with the flanges 86 and 88. As this occurs, the control member biasing spring 74 is effective to press flanges 86 and 88 against flat bottom surfaces of the recesses 182 and 184. This results in the flange 86 moving into the third recess 182 and the flange 88 moving into the fourth recess 184.

Engagement of the flanges 86 and 88 with flat side surfaces 185 and 186 of the third and fourth recesses 182 and 184 interrupts pivotal movement of the key retainer 120 relative to the housing 46. At this time, the biasing spring 126 (FIG. 15) presses the flat side surfaces 185 and 186 (FIG. 6) of the third and fourth recesses 182 and 184 against the flanges 86 and 88. This results in the key 34 connected with the key retainer 120 being held in its first active position. The longitudinal central axis of the key 34 extends transverse (perpendicular) to a longitudinal central axis of the upper slot 44 when the key 34 is in its first active position. Thus, at this time, key 34 is in a position corresponding to the first active position 52 (FIG. 1) of the key 36.

Engagement of the flanges 86 and 88 (FIGS. 4 and 5) with the flat side surfaces 185 and 186 (FIG. 6) of the third and fourth recesses 182 and 184 is effective to hold the key retainer 120 and the associated key 34 against further movement relative to the housing 46 by the associated biasing spring 126. The flat side or stop surface 185 of the third recess 182 is pressed against the flange 86 on the control member 70 by biasing spring 126. Similarly, the flat side or stop surface 186 (FIG. 6) is pressed against the flange 88 on the control member 70 by the biasing spring 126. The control member 70 is held against rotation relative to the housing 46 by engagement of the flanges 86 and 88 with the surfaces 162 (FIG. 9) of the central opening 154 in the socket 94.

This results in the key 34 being held in the first active position in which the key extends perpendicular to the longitudinal axis of the upper slot 44 in the housing 46. Although the third and fourth recesses 182 and 184 (FIG. 6) have been located in the control section 140 to position the key 34 in a first active position 52 in which the key extends perpendicular to the longitudinal axis of the upper slot 44, the third and fourth recesses 182 and 184 may be located in the central section 140 so as to position the key 34 in a first active position in which the key is skewed at an acute angle to the longitudinal central axis of the upper slot 44. For example, the longitudinal central axis of the key 34 may be skewed at an angle of forty-five degrees to the longitudinal axis of the upper slot 44 when the key 34 is in the first active position.

If it is desired to have the key 34 move from its stored position to its fully extended or second active position 54 (FIG. 1) extending parallel to the longitudinal central axis of the upper slot 44, the manual pressure is maintained against the control member 70. This results in the control member 70 being in a fully retracted position in which the flanges 86 and 88 (FIGS. 4 and 5) are fully enclosed by one of the sockets 94 (FIG. 9) in the rear section 96 of the housing 46. Therefore, the flanges 86 and 88 are spaced a slight distance from the control section 140 (FIG. 6) during rotation of the key retainer 120 through one hundred and eighty degrees from its stored position to its second active position in which the key 34 extends parallel to the longitudinal central axis of the upper slot 44. As this occurs, the flanges 86 and 88 (FIG. 5) on the control member 70 are disposed in engagement with the retaining surfaces 162 (FIG. 9) to hold the control member 70 against rotation relative the housing 46.

The key retainer 120 (FIGS. 5 and 6) moves from the stored position to the second active position under the influence of the biasing spring 126. As the key retainer 120 moves into its second active position 54 (FIG. 1) with the key 34 extending parallel to the longitudinal central axis of the upper slot 44, a generally rectangular flat side surface 188 (FIG. 6) on the outside of the key retainer 120 moves into abutting engagement with a flat stop surface 190 (FIGS. 2 and 3) on a projection 192 from the rear section 96 of the housing 46. Engagement of the side surface 188 on the key retainer 120 with the stop surface 190 interrupts movement of the key retainer under the influence of the biasing spring 126. The biasing spring 126 is effective to press the side surface 188 on the key retainer 120 against the stop surface 190 (FIG. 2).

When the manually applied force against the control member 70 is released with the side surface 188 on the key retainer 120 in engagement with the stop surface 190 (FIG. 2), the flanges 86 and 88 (FIG. 5) on the control member 70 move back into the first and second recesses 170 and 172 (FIG. 6) in the control section 140. Thus, the same recesses 170 and 172 are effective to engage the flanges 86 and 88 on the control member 70 when the key 34 is in the stored position and when the key is in the second active position in which the key extends outward from the upper slot 44 in a direction parallel to the longitudinal central axis of the slot. However, pivotal movement of the key retainer 120 will have resulted in the recesses 170 and 172 being displaced by one hundred and eighty degrees from their stored positions relative to flanges 86 and 88 on the control member 70. Therefore, the flange 86 engages the recess 172 and the flange 88 engages the recess 170 when the key 34 is in the second active position 54.

As the key retainer 120 moves to its second active position, ramps 198 and 200 (FIG. 6) on the control section 140 move pass the flanges 86 and 88 (FIGS. 4 and 5) of the manually depressed control member 70. The ramp 198 (FIG. 6) moves past the control member flange 86 and the ramp 200 moves past the control member flange 88. When the key 34 has moved to its second active position, the side surface 188 (FIG. 6) on the key retainer 120 connected with the key 34 has moved into engagement with the stop surface 190 (FIG. 2) on the front housing section 102. At this time, the flange 86 on the control member 70 is adjacent to the stop surface 173 (FIG. 6) and the flange 88 is adjacent to the stop surface 171.

The control member 70 (FIGS. 4 and 5) is then released and the spring 74 moves the flanges 86 and 88 into engagement with the first and second recesses 170 and 172 (FIG. 6). These are the same recesses as are engaged by the flanges 86 and 88 when the key 34 was in its stored position. When the upper key 34 is in its stored position, the flange 86 is disposed in engagement with the first recess 170 and the flange 88 is disposed in engagement with the second recess 172. When the key retainer 120 and upper key 34 are in their second active positions, the flange 86 is disposed in engagement with the second recess 172 and the flange 88 is disposed in engagement with the first recess 170.

When the key 34 is to be moved back to its stored position from either its first active position or its second active position, it is merely necessary to manually apply force against the key 34 to overcome the influence of the biasing spring 126. As this occurs, the flanges 86 and 88 on the control member 70 are pressed against the control section 140 (FIG. 6) on the key retainer 120 by the control member biasing spring 74.

Assuming that the key 34 is to be moved from its second active position 54 back to its stored position, the manual application of force to the key results in the ramp 198 sliding along the flange 86 and the ramp 200 sliding along the flange 88. When the key 34 has been returned to its first active position 52 against the influence of the associated biasing spring 126, the flange 86 snaps into the third recess 182 and the flange 88 snaps into the fourth recess 184 under the influence of the control member biasing spring 74.

Continued application of manual force against the key 34 pivots the key and the associated key retainer 120 back to their stored positions. As this occurs, the flange 86 is slidably engaged by the ramp 176 and the flange 88 is slidably engaged by the ramp 178. When the key 34 has been returned to its stored position, the flange 86 snaps into the first locking recess 170 and the flange 88 snaps into the second locking recess 172. The biasing spring 126 is then effective to press the stop surface 171 against the flange 86 and to press the stop surface 173 against the flange 88.

If it is desired to lock the key 34 in either its first active position or its second active position, the ramps 176, 178, 198 and 200 may be replaced by flat side surfaces which extend parallel to flat bottom surfaces of the recesses 170 and 172. The flat side surfaces which replace the ramps 176, 178, 198 and 200 will be offset axially out of the page as viewed in FIG. 6 from the bottom surfaces of the recesses 170 and 172.

The key retainer 120 is supported for rotation relative to the housing 46 by engagement of a cylindrical bearing or side surface 204 (FIGS. 6, 7 and 8) on one of the control sections 140 with a cylindrical bearing or side surface 206 (FIG. 9) on the socket 94 in the rear section 96 of the housing 46. The key retainer 120 is also supported for rotation by engagement of a cylindrical bearing or side surface 204 on a control section 140 with a cylindrical bearing or side surface 208 (FIG. 3) of a socket 210 formed in the front section 102 of the housing 46.

The key retainer 120 is integrally formed as one piece of cast metal. However, the key retainer 120 may be formed by a plurality of interconnected pieces if desired. Rather than being formed of metal, the key retainer 120 may be formed of a suitable polymeric material.

Although only one side of the key retainer 120 is illustrated in FIG. 6, it should be understood that the opposite side of the key retainer has the same construction and configuration as the side illustrated in FIG. 6. By forming opposite sides of the key retainer 120 with the same construction, the key retainer is symmetrical. This enables the key retainer 120 to be mounted in either one of two orientations in the housing 46 to facilitate assembly of the apparatus 30.

Although the foregoing description has been in conjunction with the key retainer 120 and the upper key 34, it should be understood that the upper key 36 and the lower keys 38 and 40 are also connected with key retainers 120. The key retainers 120 for the upper key 36 and lower keys 38 and 40 cooperate with the housing 46 and control members 70 in the actuator assemblies 62, 64 and 66 in the same manner as previously described in conjunction with the upper key 34 and control member 70 in the actuator assembly 60.

The upper key 34 and its associated key retainer 120 cooperate with a stop surface 190 on a projection 192 from the rear section 96 (FIGS. 2 and 3) of the housing 46 to locate the upper key 34 in its second active position in which the upper key extends parallel to the longitudinal axis of the upper slot 44. The front section 102 of the housing 46 is provided with a projection 220 (FIGS. 2 and 3) having a stop surface 222 which is engaged by the key retainer 120 associated with the upper key 36 when the upper key is in its second active position 54 extending parallel to the longitudinal central axis of the upper slot 44.

A stop surface 226 is provided on the projection 192 to limit movement of the key retainer 120 associated with the lower key 38. Similarly, a stop surface 228 is provided on the projection 220 to limit movement of the key retainer 120 associated with the lower key 40 when the lower key has moved to its second active position extending parallel to the longitudinal central axis of the lower slot 48.

The control section 140 on each of the key retainers 120 has a circular opening 234 (FIG. 6) through which the control member 70 extends. The circular opening 234 is disposed in a coaxial relationship with the cylindrical outer side surface 204 of the control section 140. The opening 234 has a slightly larger diameter than the cylindrical body 90 of the control member 70. Therefore, the key retainer 120 is supported by engagement of the annular outer side surface 204 on the control section 140 with the socket 94 on the rear section 96 (FIG. 2) of the housing 46 and by engagement of the outer side surface 204 of the control section 140 with a socket 210 (FIG. 3) on the front section 102 of the housing 46. This results in the control member 70 being freely movable, in an axial direction, relative to the key retainer 120.

Keys

The keys 34–40 (FIGS. 2 and 3) are releasably connected with the key retainers 120. The illustrated keys 34–40 are blanks. These blanks can be disconnected from the key retainers 120 and customized to fit a desired lock. The key blanks may be customized by cutting away materials of the key blanks to form notches which cooperate with tumblers of the lock with which the key is associated. However, it should be understood that the keys 34–40 may not be blanks and may have already been customized or notched for cooperation with a particular lock.

When a key 240 (FIG. 10) is to be used in association with the apparatus 30, a head end portion 242 of the key is partially cut away from a shank 244 of the key. The material of the head end portion 242 to be cut away has been cross-sectioned in FIG. 10. The remainder of the head end portion 242 of the key 240 forms an end portion 246 of the key 240. The end portion 246 of the key 240 has a pair of notches 250 and 252. The key 240 has been customized to fit a particular lock. However, the key 240 may be a blank.

Once the excess material has been cut away from the head end portion 242 of the key 240 (FIG. 10), the key can be inserted into a key retainer 120 (FIGS. 6–8). As the end portion 246 of the key 240 is inserted into the socket 146 and a key retainer, the notches 250 and 252 move into alignment with set screw openings 256 in side walls of the key retainer 120 (FIGS. 7 and 8). Metal set screws 262 (FIG. 11) are disposed in the set screw openings 256 in the metal key retainer 120.

By tightening the set screws 262, force is applied against the end portion 246 to the key 240 to urge the key upward (as viewed in FIG. 11) into the socket 146 (FIG. 8) in the key retainer 120. This results in the end portion 246 of the key 240 being firmly pressed against an end surface of the socket 146. The key 240 is securely gripped by the cooperation between the set screws 262 and the key retainer 120. If desired, the key retainer 120 may be constructed so as to grip the key 240 in a manner which is different than the specific manner disclosed herein.

Figure 10:
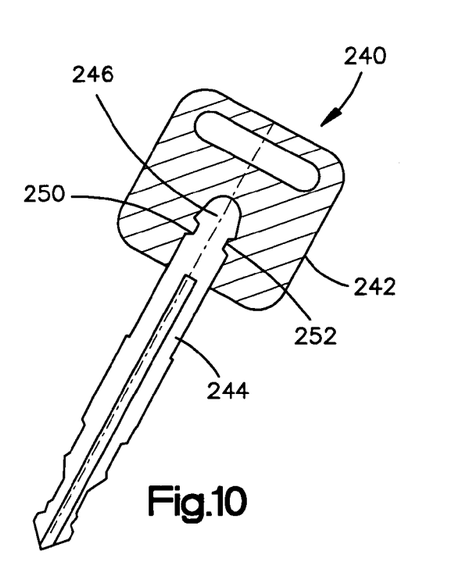
FIG. 10 is a schematic plan view illustrating the manner in which a head end portion of a key may be cut away.
Figure 11:
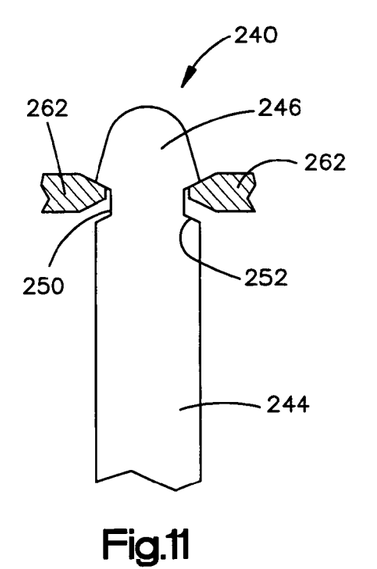
FIG. 11 is a schematic illustration depicting the manner in which fasteners connected with the key retainer of FIGS. 6–8, are used to secure the key of FIG. 10 in the key retainer after the head end portion of the key has been cut away.
Figure 12:
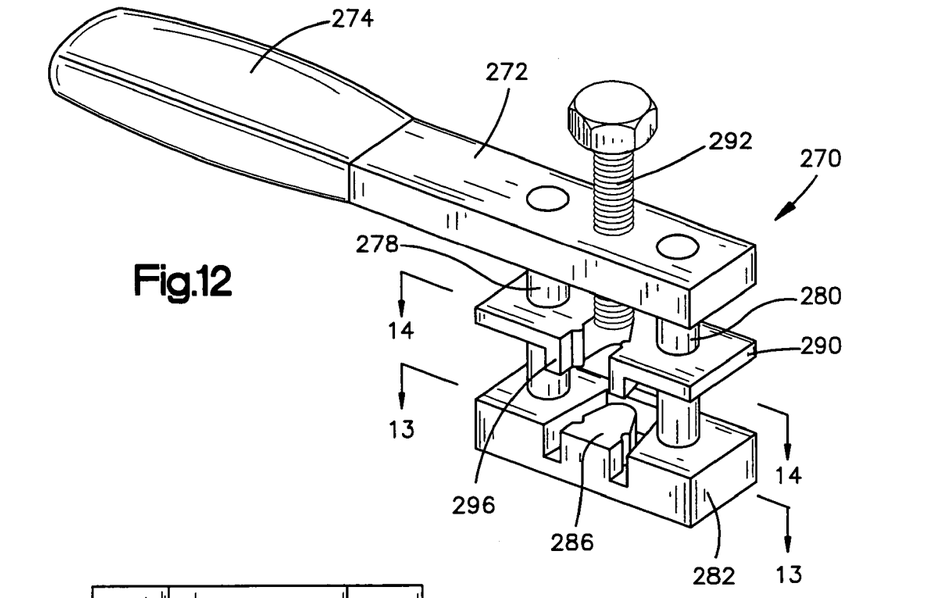
FIG. 12 is a schematic pictorial illustration of an apparatus which may be utilized to cut away the head end portion of the key of FIG. 10.
Figure 13:
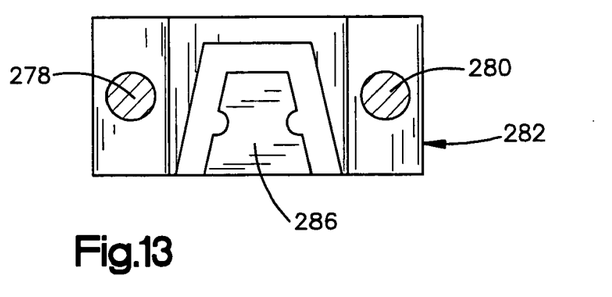
FIG. 13 is a schematic plan view, taken generally along the line 13—13 of FIG. 12, illustrating the construction of a stationary die which may be utilized in cutting away the head end portion of the key of FIG. 10.

The head end portion 242 of the key 240 may be trimmed to the configuration illustrated in FIGS. 10 and 11 by the use of a screw press 270 (FIG. 12). The screw press 270 includes a base member 272 having a handle 274. A pair of parallel cylindrical support members or columns 278 and 280 extend downward from the base 272 to a fixed or stationary die 282 (FIGS. 12 and 13). The stationary die 282 has a raised central portion 286 having a configuration corresponding to the desired configuration of the end portion 246 (FIG. 10) of the key 240.

A movable die 290 is connected with a drive screw 292 (FIG. 12). The drive screw 292 is rotatable to move the movable die 290 downward toward the stationary die 282. As the movable die 290 moves toward the stationary die 282, the head end portion 242 (FIG. 10) of the key 240 is trimmed.

When the key 240 (FIG. 10) is to be trimmed, the head end portion 242 of the key is placed on and centered relative to the raised central portion 286 of the fixed or stationary die 282. The drive screw 292 is then rotated with a suitable tool 296, such as a wrench. However, the drive screw 292 could be rotated in a different manner if desired.

Figure 14:
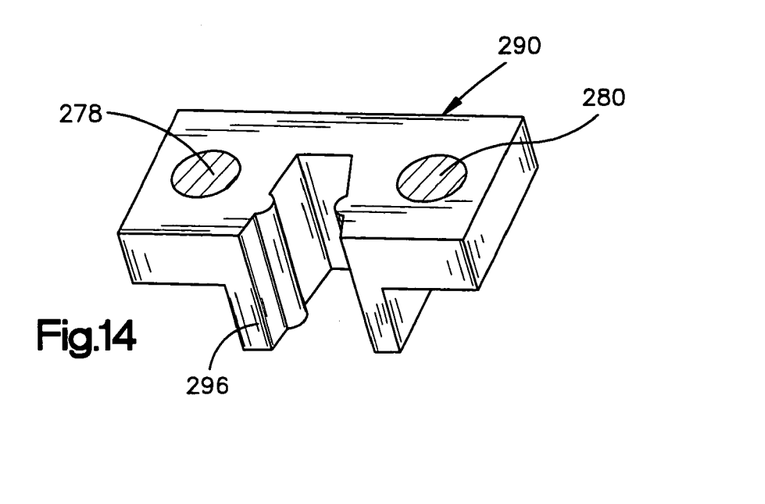
FIG. 14 is a schematic pictorial illustration, taken generally along the line 14—14 of FIG. 12, illustrating a movable die which is associated with the stationary die of FIG. 13 to cut away the head end portion of the key of FIG. 10.

Rotation of the drive screw 292 moves the movable die 290 downward toward the fixed die 282. As this occurs, the downwardly extending portion 296 (FIGS. 12 and 14) of the movable die 290 moves into engagement with an upper side surface of the head end portion 242 (FIG. 10) of the key 240. Continued rotation of the drive screw 292 (FIG. 12) moves the movable die 290 downward. The downwardly extending portion 296 of the movable die and the stationary raised center portion 286 of the fixed die 282 cooperate to trim the head end portion 242 of the key 240 to a desired configuration with a shearing action.

It is contemplated that many different types of devices may be utilized to trim away excess material from the head end portion 242 of the key 240 (FIG. 10). For example, it is contemplated that an arbor press/punch 302 (FIG. 15) may be used to trim the end portion 242 of the key 240. The arbor press 302 has a base 306 with a recess 308 in which the key 240 is held in the manner illustrated schematically in FIG. 16.

Figure 15:
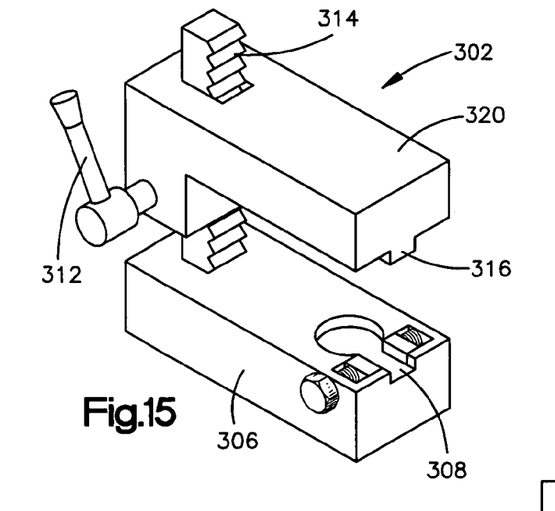
FIG. 15 is a schematic plan view of an arbor press which may be utilized to cut away a head end portion of the key of FIG. 10.
Figure 16:
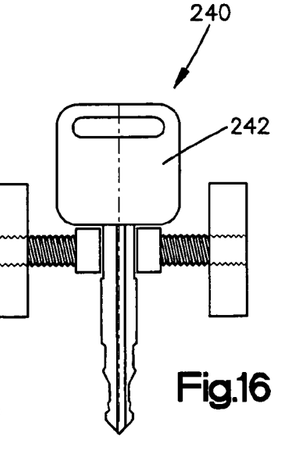
FIG. 16 is a fragmentary schematic illustration depicting the manner in which a key is gripped in the arbor press of FIG. 15.

Once the key 240 has been gripped in the recess 308, in the manner illustrated in FIG. 16, a handle 312 on the arbor press 302 may be rotated. Rotation of the handle 312 rotates a pinion gear (not shown) connected with the handle relative to a rack gear 314. A movable die 316 is moved downward toward the recess 308 and the key 240 with a movable section 320 of the arbor press 302 as the handle is rotated. The die 316 engages the head end portion 240 (FIG. 16) of the key 240 to trim the key to the desired configuration.

Figure 17:
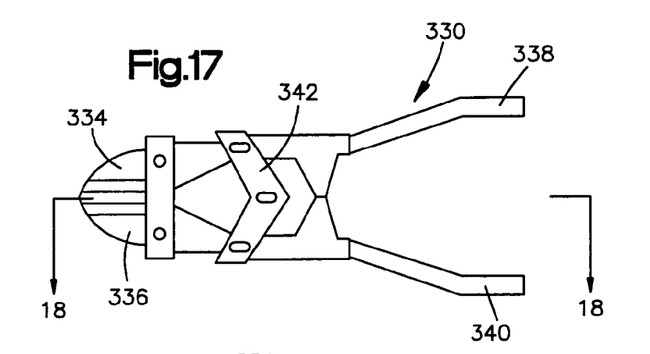
FIG. 17 is a schematic illustration of a cutter which may be utilized to cut away the head end portion of the key of FIG. 10.

Alternatively, it is contemplated that shears 330 (FIG. 17) may be utilized to trim the head end portion 242 of the key 240 (FIG. 10). The shears 330 (FIG. 17) include a pair of relatively movable jaws 334 and 336. Handles 338 and 340 are connected with the jaws 334 and 336. A known linkage 342 is provided between the jaws to increase the mechanical advantage of the handles 340 and 342. The shears 330 have a construction similar to the construction of known bolt cutters.

Figure 18:
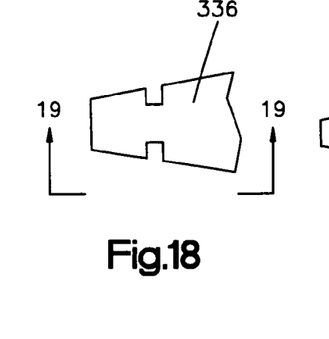
FIG. 18 is a schematic plan view, taken generally along the line 18—18 of FIG. 17, illustrating a configuration of a portion of a blade of the cutter of FIG. 16.
Figure 19:
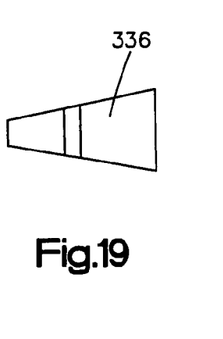
FIG. 19 is a schematic side elevational view, taken generally along the line 19—19 of FIG. 18, further illustrating the construction of the blade of the cutter of FIG. 17.
Figure 20:
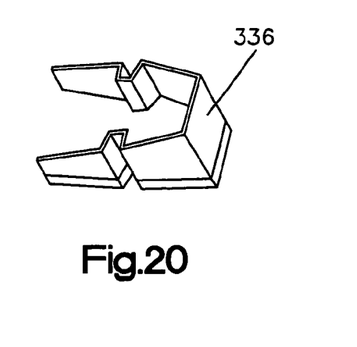
FIG. 20 is a schematic pictorial representation of the blade of the cutter of FIG. 17.

The lower jaw 336 (FIG. 18) of the shears 330 has a configuration corresponding to the desired configuration of the head end portion of the key 240. The upper jaw 334 has a configuration so as to mate with the lower jaw 336. The lower jaw 336 is tapered so as to have the ramped configuration illustrated in FIGS. 19 and 20. The ramped configuration results in only a small part of the head end portion 242 of the key 240 being cut at any one time. The cut proceeds progressively as the handles 338 and 340 are moved toward each other to close the jaws 334 and 336 of the shears 330.

It is also contemplated that the head end portion 242 (FIG. 10) of a key 240 may be trimmed using a template and a milling cutter. The template would have a configuration corresponding to the desired configuration of the end portion 246 of the key 240. The template would be engaged by a follower connected with a rotatable blade of the milling cutter. The milling cutter and follower may have the same construction as many known key duplicating machines.

Remote Keyless Entry Unit

A remote keyless entry unit 350 (FIGS. 21 and 22) may advantageously be connected with the rear section 96 (FIG. 3) of the apparatus 30. Although it is preferred to utilize the remote keyless entry unit 350 in association with the apparatus 30, it should be understood that different types of auxiliary units may be connected with the apparatus 30. For example, a cellular phone may be connected with the apparatus 30. However, it is believed that, under certain circumstances, at least, it may be preferred to connect the remote keyless entry unit 350 with the apparatus 30.

The remote keyless entry unit 350 (FIGS. 21 and 22) includes a housing 351 having a cover section 352 which is connected with a base section 354. The base section 354 and cover section 352 of the housing 351 cooperate to form a cavity in which printed circuitry 356 is disposed. The printed circuitry 356 is fixedly connected to the base section 354 of the housing 351.

The cover section 352 (FIG. 21) of the housing 351 has three manually actuatable button sections 362, 364 and 366. The button section 362 is manually actuatable to operate the printed circuitry 356 to lock the doors of a vehicle. The button section 366 is manually actuatable to operate the printed circuitry 356 to unlock the vehicle doors. The button section 364 is operable to actuate an auxiliary unit, such as a lock for a trunk lid.

Figure 21:
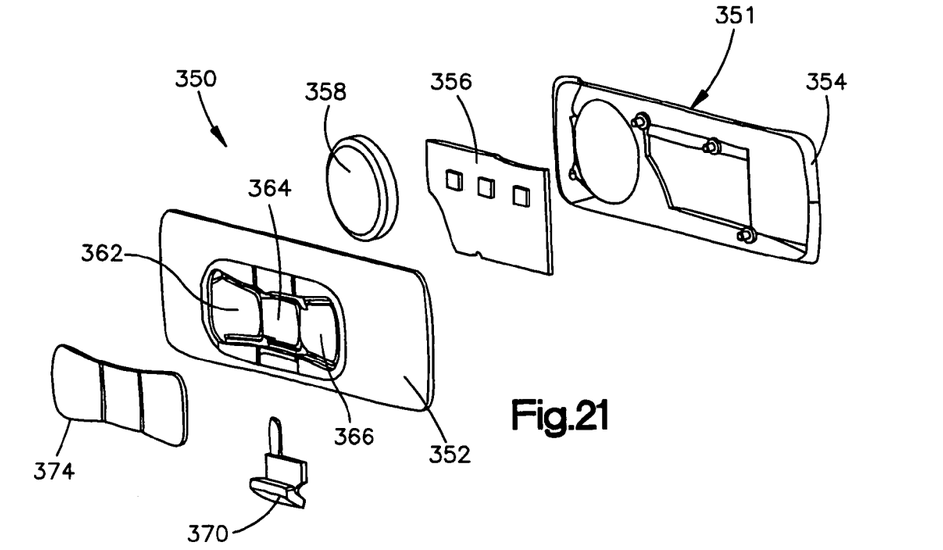
FIG. 21 is a front exploded schematic illustration of a remote keyless entry device which is connected with the apparatus of FIGS. 1–3.
Figure 22:
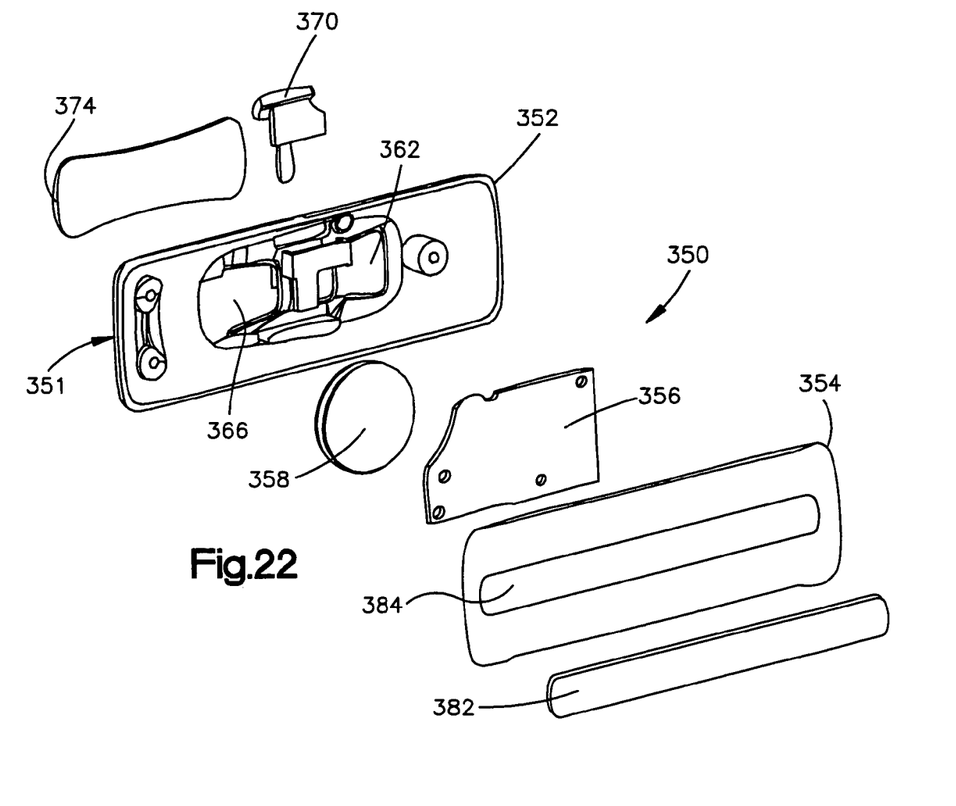
FIG. 22 is a rear exploded schematic illustration of the remote keyless entry device of FIG. 21.

In addition to the button sections 362–366, the remote keyless entry unit 350 includes a panic button 370. Manual actuation of the panic button 370 causes the printed circuitry 356 to effect flashing of lights of an associated vehicle and/or sounding of the horn of the vehicle.

A flexible overlay 374 is connected with the cover section 352 and extends over the button sections 362–366. Suitable markings are provided on the overlay to indicate the functions of the buttons 362–366. The general construction and mode of operation of the remote keyless entry unit 350 is well known and is similar to the construction or mode of operation of commercially available remote keyless entry units.

The housing 351 of the remote keyless entry unit 350 is connected with the rear section 96 of the apparatus 30 by the magnets 110 (FIG. 2). A metal strip 382 (FIG. 22) of iron or other magnetizable material is mounted on the base section 354 of the housing 351 of the remote keyless entry unit 350. The metal strip 382 is mounted in a recess 384 in the base section 354 of the remote keyless entry unite 350 by suitable adhesive or other fastener.

The magnets 110 in the rear section 96 of the apparatus 30 attract the metal strip 382 to connect the remote keyless entry unit 350 with the apparatus 30. Rather than having a metal strip 382, magnets may be mounted in the base section 354 of the remote keyless entry unit 350 in the same manner as in which they are mounted in the rear section 96 of the apparatus 30. The magnets in the base section 354 of the remote keyless entry unit 350 would be oriented so that they would be attracted by the magnets 110 in the rear section 96 of the apparatus 30 when the remote keyless entry unit 350 is in the desired orientation relative to the remote keyless entry unit. If desired, a magnetic strip may be substituted for the metal strip 382.

Although it is preferred to utilize magnetic attraction to connect the remote keyless unit 350 with the apparatus 30, the remote keyless unit may be connected with the apparatus 30 in a different manner if desired. For example, a hook and loop type fastener, such as "Velcro" (trademark), may be utilized. Alternatively, mechanical fasteners, such as screws, may be utilized to connect a remote keyless entry unit 350 with the rear section 96 of the apparatus 30.

CONCLUSION

The present invention relates to a new and improved apparatus 30 for storing and positioning one or more keys 34–40. The apparatus 30 includes a housing 46. A key 34, 36, 38 or 40 is mounted for pivotal movement from a stored position in the housing 46 to an active position extending away from the housing 46. An actuator assembly 60, 62, 64 or 66 is manually operable to effect movement of the key 34, 36, 38 or 40 from the stored position to the active position.

The key 34, 36, 38 or 40 may be movable from the stored position to either one of two active positions. When the key 36 is in the first active position 52, the key extends transverse to a longitudinal axis of the housing 46. When the key 36 is in a second active position 54, the key extends parallel to the longitudinal axis of the housing. A greater or lesser number of active positions may be provided if desired.

The key 34, 36, 38 or 40 may be connected with a key retainer 120 which is mounted for pivotal movement relative to the housing 46. When a key retainer 120 is utilized, an end portion 148 of the key may be connected with the key retainer with a shank portion 150 of the key extending away from the key retainer. When a plurality of keys 34, 36, 38, and 40 are provided, a plurality of key retainers 120 may be provided. When there are a plurality of keys 34, 36, 38 and 40, the shank portions 150 of two of the keys 34 and 36 or 38 and 40 may be disposed in a side-by-side relationship with each other in the housing when the keys are in their stored positions. Key identifiers 149 may be connected with the key retainers 120.

When a plurality of keys 34, 36, 38, 40 are utilized, the actuators 60, 62, 64, 66 for the keys may all have manually movable members 70 which are accessible from the same side 102 of the housing. This enables an auxiliary unit to be connected with the opposite side of the housing. One or more magnets 110 may be provided in the housing 46 to secure the unit auxiliary to the housing.

The auxiliary unit may have many different constructions and purposes. For example, the auxiliary unit may be a remote keyless entry unit 350. Alternatively, the auxiliary unit may be another housing 46 for a plurality of keys. If desired, the auxiliary unit may be secured to the housing with fasteners other than magnets.

The key or keys 34, 36, 38, 40 may be blanks capable of being modified for association with specific locks. Alternatively, the keys 34, 36, 38, 40 may have already been modified for association with a specific lock. A head end portion 242 of the key may be partially cut away to enable the key to be connected with a key retainer 120.

The present invention has many different features which may be utilized together in the manner disclosed herein. Alternatively, the various features may be used separately or in different combinations with each other. For example, the apparatus 30 may be constructed without magnets 110 to attract a unit to be connected with the apparatus. As another example, the key retainer 120 may be eliminated and the head end portion 242 of the key connected with the housing 46. As was previously mentioned, the apparatus 30 may be constructed so as to store only a single key 34 or may be constructed so as to store a plurality of keys.

Having described the invention, the following is claimed:

1. An apparatus for use in storing and positioning keys, said apparatus comprising:

a housing, a first key mounted for pivotal movement relative to said housing, said first key being pivotal between a stored condition disposed adjacent to said housing and an active condition extending away from said housing, a second key mounted for pivotal movement relative to said housing, said second key being pivotal between a stored condition disposed adjacent to said housing and an active condition extending away from said housing, a third key mounted for pivotal movement relative to said housing, said third key being pivotal between a stored condition disposed adjacent to said housing and an active condition extending away from said housing, a fourth key mounted for pivotal movement relative to said housing, said fourth key being pivotal between a stored condition disposed adjacent to said housing and an active condition extending away from said housing, wherein said housing has a first slot extending along a first side of said housing and a second slot extending along a second side of said housing, said first key being disposed in said first slot when said first key is in the stored condition, said first key extends away from said first slot when said first key is in the active condition, said second key being disposed in said first slot when said second key is in the stored condition, said second key extends away from said first slot when said second key is in the active condition, said third key being disposed in said second slot when said third key is in the stored condition, said third key extends away from said second slot when said third key is in the active condition, said fourth key being disposed in said second slot when said fourth key is in the stored condition, said fourth key extends away from said second slot when said fourth key is in the active condition, wherein said apparatus further comprises a first actuator assembly disposed adjacent to a first end portion of said first slot, said first actuator assembly being manually actuatable to effect movement of said first key from the stored condition to the active condition, a second actuator assembly disposed adjacent to a second end portion of said first slot, said second actuator assembly being manually actuatable to effect movement of said second key from the stored condition to the active condition, a third actuator assembly disposed adjacent to a first end portion of said second slot, said third actuator assembly being manually actuatable to effect movement of said third key from the stored condition to the active condition, and a fourth actuator assembly disposed adjacent to a second end portion of said second slot, said fourth actuator assembly being manually actuatable to effect movement of said fourth key from the stored condition to the active condition.

2. An apparatus as set forth in claim 1 wherein said housing includes a major side which extends between said first and second sides of said housing, each of said actuator assemblies includes a manually engagable member which is disposed adjacent to said major side of said housing.

3. An apparatus for use in storing and positioning keys, said apparatus comprising:

a housing, a first key mounted for pivotal movement relative to said housing, said first key being pivotal between a stored condition disposed adjacent to said housing and an active condition extending away from said housing, a second key mounted for pivotal movement relative to said housing, said second key being pivotal between a stored condition disposed adjacent to said housing and an active condition extending away from said housing, a third key mounted for pivotal movement relative to said housing, said third key being pivotal between a stored condition disposed adjacent to said housing and an active condition extending away from said housing, a fourth key mounted for pivotal movement relative to said housing, said fourth key being pivotal between a stored condition disposed adjacent to said housing and an active condition extending away from said housing, wherein said housing has a first slot extending along a first side of said housing and a second slot extending along a second side of said housing, said first key being disposed in said first slot when said first key is in the stored condition, said first key extends away from said first slot when said first key is in the active condition, said second key being disposed in said first slot when said second key is in the stored condition, said second key extends away from said first slot when said second key is in the active condition, said third key being disposed in said second slot when said third key is in the stored condition, said third key extends away from said second slot when said third key is in the active condition, said fourth key being disposed in said second slot when said fourth key is in the stored condition, said fourth key extends away from said second slot when said fourth key is in the active condition, wherein said apparatus further comprises a first key retainer which is at least partially disposed in a first end portion of said first slot and is connected with said first key, said first key retainer being pivotal relative to said housing from a stored condition to an active condition to move said first key from its stored condition to its active condition, a second key retainer which is at least partially disposed in a second end portion of said first slot and is connected with said second key, said second key retainer being pivotal relative to said housing from a stored condition to an active condition to move said second key from its stored condition to its active condition, a third key retainer which is at least partially disposed in a first end portion of said second slot and is connected with said third key, said third key retainer being pivotal relative to said housing from a stored condition to an active condition to move said third key from its stored condition to its active condition, and a fourth key retainer which is at least partially disposed in a second end portion of said second slot and is connected with said fourth key, said fourth key retainer being pivotal relative to said housing from a stored condition to an active condition to move said fourth key from its stored condition to its active condition.

4. An apparatus for use in storing and positioning keys, said apparatus comprising:

a housing, a first key mounted for pivotal movement relative to said housing, said first key being pivotal between a stored condition disposed adjacent to said housing and an active condition extending away from said housing, a second key mounted for pivotal movement relative to said housing, said second key being pivotal between a stored condition disposed adjacent to said housing and an active condition extending away from said housing, a third key mounted for pivotal movement relative to said housing, said third key being pivotal between a stored condition disposed adjacent to said housing and an active condition extending away from said housing, a fourth key mounted for pivotal movement relative to said housing, said fourth key being pivotal between a stored condition disposed adjacent to said housing and an active condition extending away from said housing, wherein said housing has first and second sides, a first actuator disposed adjacent to said first side of said housing, said first actuator being manually actuatable to effect movement of said first key between the stored condition and the active condition, a second actuator disposed adjacent to said first side of said housing, said second actuator being manually actuatable to effect movement of said second key between the stored condition and the active condition, a third actuator disposed adjacent to said first side of said housing, said third actuator being manually actuatable to effect movement of said third key between the stored condition and the active condition, a fourth actuator disposed adjacent to said first side of said housing, said fourth actuator being manually actuatable to effect movement of said fourth key between the stored condition and the active condition, and a remote keyless entry unit disposed adjacent to said second side of said housing.

5. An apparatus for use in storing and positioning keys, said apparatus comprising:

a housing, a first key retainer at least partially disposed in said housing and mounted for pivotal movement about a first axis extending through a first end portion of said housing, said first key retainer being pivotal about said first axis between a first stored position and a first active position, a first key having an end portion connected with said first key retainer and a shank portion extending from said end portion of said first key, said first key being pivotal about said first axis with said first key retainer during movement of said first key retainer between the first stored position and the first active position, a second key retainer at least partially disposed in said housing and mounted for pivotal movement about a second axis extending through a second end portion of said housing, said second key retainer being pivotal about said second axis between a second stored position and a second active position, a second key having an end portion connected with said second key retainer and a shank portion extending from said end portion of said second key, said second key being pivotal about said second axis with said second key retainer during movement of said second key retainer between the second stored position and the second active position, said shank portions of said first and second keys being disposed in a side by side relationship when said first key retainer is in the first stored position and said second key retainer is in the second stored position, a third key retainer being at least partially disposed in said housing and mounted for pivotal movement about a third axis extending through the first end portion of said housing, said third key retainer being pivotal about said third axis between a third stored position and a third active position, a third key having an end portion connected with said third key retainer and a shank portion extending from said end portion of said third key, said third key being pivotal about said third axis with said third key retainer during movement of said third key retainer between the third stored position and the third active position, a fourth key retainer at least partially disposed in said housing and mounted for pivotal movement about a fourth axis extending through the second end portion of said housing, said fourth key retainer being pivotal about said fourth axis between a fourth stored position and a fourth active position, and a fourth key having an end portion connected with said fourth key retainer and a shank portion extending from said end portion of said fourth key, said fourth key being pivotal about said fourth axis with said fourth key retainer during movement of said fourth key retainer between the fourth stored position and the fourth active position, said shank portions of said third and fourth keys being disposed in a side-by-side relationship in said housing when said third key retainer is in the third stored position and said fourth key retainer is in the fourth stored position.

6. An apparatus as set forth in claim 5 wherein said end portion of said first key is spaced from said first axis, said end portion of said second key is spaced from said second axis, said end portion of said third key is spaced from said third axis, and said end portion of said fourth key is spaced from said fourth axis.

7. An apparatus as set forth in claim 5 further including a first actuator assembly disposed in alignment with said first axis, said first actuator assembly being manually actuatable to effect movement of said first key retainer about the first axis from the first stored position to the first active position, a second actuator assembly disposed in alignment with said second axis, said second actuator assembly being manually actuatable to effect movement of said second key retainer about the second axis from the second stored position to the second active position, a third actuator assembly disposed in alignment with said third axis, said third actuator assembly being manually actuatable to effect movement of said third key retainer about the third axis from the third stored position to the third active position, and a fourth actuator assembly disposed in alignment with said fourth axis, said fourth actuator assembly being manually actuatable to effect movement of said fourth key retainer about said fourth axis from the fourth stored position to the fourth active position.

8. An apparatus as set forth in claim 7 wherein said housing includes a major side, each of said actuator assemblies includes a manually engagable member which is disposed adjacent to said major side of said housing.

\* \* \* \* \*